(12) United States Patent
Sun et al.

(10) Patent No.: US 11,191,103 B2
(45) Date of Patent: Nov. 30, 2021

(54) PRACH AND SR TRANSMISSIONS FOR NEW RADIO IN UNLICENSED SPECTRUM

(71) Applicant: QUALCOMM Incorporated, San Diego, CA (US)

(72) Inventors: Jing Sun, San Diego, CA (US); Xiaoxia Zhang, San Diego, CA (US); Srinivas Yerramalli, San Diego, CA (US); Ozcan Ozturk, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 56 days.

(21) Appl. No.: 16/674,763

(22) Filed: Nov. 5, 2019

(65) Prior Publication Data

US 2020/0154471 A1    May 14, 2020

Related U.S. Application Data

(60) Provisional application No. 62/758,301, filed on Nov. 9, 2018.

(51) Int. Cl.
*H04W 74/00* (2009.01)
*H04W 16/14* (2009.01)
(Continued)

(52) U.S. Cl.
CPC ......... *H04W 74/006* (2013.01); *H04W 16/14* (2013.01); *H04W 72/1284* (2013.01); *H04W 74/0808* (2013.01); *H04W 74/0833* (2013.01)

(58) Field of Classification Search
CPC ........... H04W 74/006; H04W 74/0808; H04W 74/0833; H04W 16/14; H04W 72/1284
See application file for complete search history.

(56) References Cited

U.S. PATENT DOCUMENTS

| 2017/0041953 A1* | 2/2017 | Zhou | H04W 74/0816 |
| 2017/0238306 A1* | 8/2017 | Patel | H04L 5/0053 |
| | | | 370/329 |

(Continued)

FOREIGN PATENT DOCUMENTS

WO    2019245779 A1    12/2019

OTHER PUBLICATIONS

Interdigital Inc: "Channel Access Procedure and Coexistence in NR-U", 3GPP Draft, 3GPP TSG RAN WG1 Meeting #94, R1-1809089, Channel Access Procedure and Coexistence in NR-U, 3rd Generation Partnership Project (3GPP), Mobile Competence Centre, 650, Route Des Lucioles, F-06921, Sophia-Antipolls Cedex, France, vol. RAN WG1, No. Gothenburg, Sweden, Aug. 20, 2018-Aug. 24, 2018, Aug. 11, 2018 (Aug. 11, 2018), XP051516458, 6 pages, Retrieved from the Internet: URL: ttp://www.3gpp.org/ftp/tsg%5Fran/WG1%5FRL1/TSGR1%5F94/Docs/R1%2D1809089%2Ezip [retrieved on Aug. 11, 2018], the whole document.

(Continued)

*Primary Examiner* — Chi H Pham
*Assistant Examiner* — Vladislav Y Agureyev
(74) *Attorney, Agent, or Firm* — Arent Fox, LLP

(57) ABSTRACT

Uplink signaling in unlicensed or shared spectrum may be subject to listen before talk procedures resulting in failed signaling transmissions. A user equipment (UE) may perform uplink signaling using a configuration based on whether a base station has entered a channel occupancy time (COT) shared with the UE. A UE may determine that the UE has an uplink transmission for a base station. A UE may determine whether the base station has entered a channel occupancy time that is shared with the UE. A UE may determine configured random access or scheduling request transmission resources based on the channel occupancy time, wherein a density of transmission opportunities is (Continued)

greater outside of the shared channel occupancy time than within the shared channel occupancy time. A UE may transmit a random access message or the scheduling request on selected configured resources.

30 Claims, 8 Drawing Sheets

(51) Int. Cl.
*H04W 74/08* (2009.01)
*H04W 72/12* (2009.01)

(56) References Cited

U.S. PATENT DOCUMENTS

| | | | | |
|---|---|---|---|---|
| 2017/0279584 | A1* | 9/2017 | Pajukoski | H04W 74/0833 |
| 2018/0176945 | A1* | 6/2018 | Cao | H04W 72/1268 |
| 2019/0037509 | A1* | 1/2019 | Li | H04L 5/001 |
| 2019/0045529 | A1* | 2/2019 | Xiong | H04W 72/0446 |
| 2019/0223215 | A1* | 7/2019 | Tian | H04L 5/00 |
| 2019/0335456 | A1* | 10/2019 | Yerramalli | H04W 74/0808 |
| 2019/0387546 | A1* | 12/2019 | Li | H04W 74/0833 |
| 2020/0053798 | A1* | 2/2020 | Tsai | H04W 72/14 |
| 2020/0092913 | A1* | 3/2020 | Xu | H04W 48/16 |
| 2020/0100247 | A1* | 3/2020 | Zhang | H04W 74/006 |
| 2020/0228995 | A1* | 7/2020 | Yang | H04W 74/0808 |
| 2020/0337072 | A1* | 10/2020 | Lunttila | H04L 5/0053 |

OTHER PUBLICATIONS

Interdigital Inc: "On NR-U Frame Structure", 3GPP Draft, 3GPP TSG RAN WG1 Meeting #94, R1-1809086, On NR-U Frame Structure, 3rd Generation Partnership Project (3GPP), Mobile, Competence Centre, 650, Route Des Lucioles, F-06921, Sophia-Anti Polis Cedex, France, vol. RAN WG1, No. Gothenburg, Sweden, Aug. 20, 2018-Aug. 24, 2018, Aug. 11, 2018 (Aug. 11, 2018), XP051516455, 5 pages, Retrieved from the Internet: URL: http://www.3gpp.org/ftp/tsg%5Fran/WG1%5FRL1/TSGR1%5F94/Docs/R1%2D1809086%2Ezip. [retrieved on Aug. 11, 2018] section 5, the whole document.

International Search Report and Written Opinion—PCT/US2019/060091—ISA/EPO—dated Mar. 26, 2020.

Qualcomm Incorporated: "DL Signals and Channels for NR-U", 3GPP Draft, 3GPP TSG RAN WG1 Meeting #96b, R1-1904997, 7.2.2.1.2, DL Signals and Channels for NR-U, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Mar. 30, 2019 (Mar. 30, 2019), XP051691920, 10 pages, Retrieved from the Internet: URL:http://www.3gpp.org/ftp/tsg%5Fran/WG1%5FRL1/TSGR1%5F96b/Docs/R1%2D1904997%2Ezig [retrieved on Mar. 30, 2019], the whole document.

\* cited by examiner

PRACH AND SR TRANSMISSIONS FOR NEW RADIO IN UNLICENSED SPECTRUM

CLAIM OF PRIORITY UNDER 35 U.S.C. § 119

This application claims priority to U.S. Provisional Application No. 62/758,301 titled "PRACH AND SR TRANSMISSIONS FOR NEW RADIO IN UNLICENSED SPECTRUM," filed Nov. 9, 2018, which is assigned to the assignee hereof, and incorporated herein by reference in its entirety.

BACKGROUND

Technical Field

The present disclosure relates generally to communication systems, and more particularly, to transmissions in unlicensed spectrum.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, deployment of 5G NR in unlicensed spectrum may be desired to improve or replace existing wireless networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may include determining that a UE has an uplink transmission for a base station. The method may include determining whether the base station has entered a channel occupancy time that is shared with the UE. The method may include determining configured random access or scheduling request transmission resources based on the channel occupancy time, wherein a density of transmission opportunities is greater outside of the shared channel occupancy time than within the shared channel occupancy time. The method may include transmitting a random access message or the scheduling request on selected configured resources.

In an aspect, the disclosure provides an apparatus for wireless communication including a memory; and at least one processor coupled to the memory. The processor may be configured to determine that a UE has an uplink transmission for a base station. The processor may be configured to determine whether the base station has entered a channel occupancy time that is shared with the UE. The processor may be configured to determine configured random access or scheduling request transmission resources based on the channel occupancy time, wherein a density of transmission opportunities is greater outside of the shared channel occupancy time than within the shared channel occupancy time. The processor may be configured to transmit a random access message or the scheduling request on selected configured resources.

In an aspect, the disclosure provides an apparatus for wireless communication. The apparatus may include means for determining that a UE has an uplink transmission for a base station. The apparatus may include means for determining whether the base station has entered a channel occupancy time that is shared with the UE. The apparatus may include means for determining configured random access or scheduling request transmission resources based on the channel occupancy time, wherein a density of transmission opportunities is greater outside of the shared channel occupancy time than within the shared channel occupancy time. The apparatus may include means for transmitting a random access message or the scheduling request on selected configured resources.

In an aspect, the disclosure provides a computer-readable medium storing computer executable code. The computer-readable medium may include code to determine that a UE has an uplink transmission for a base station. The computer-readable medium may include code to determine whether the base station has entered a channel occupancy time that is shared with the UE. The computer-readable medium may include code to determine configured random access or scheduling request transmission resources based on the channel occupancy time, wherein a density of transmission opportunities is greater outside of the shared channel occupancy time than within the shared channel occupancy time. The computer-readable medium may include code to transmit a random access message or the scheduling request on selected configured resources.

In another aspect, the disclosure provides method of wireless communications that may be performed by a base station. The method may include signaling at least a first uplink signaling configuration to a UE, the first uplink signaling configuration for use outside of a channel occupancy time (COT). The method may include transmitting a downlink control channel indicating that a base station has entered the COT to be shared with the UE, the COT being associated with a second uplink signaling configuration, wherein a density of transmission opportunities is greater outside of the shared channel occupancy time than within the shared channel occupancy time. The method may include receiving a scheduling request or random access message from the UE according to one of the first uplink signaling configuration or the second uplink signaling configuration based on whether the base station is in the COT at a time of the scheduling request or random access message.

In another aspect, the disclosure provides an apparatus for wireless communication including a memory and at least one processor coupled to the memory. The processor may be configured to signal at least a first uplink signaling configuration to a UE, the first uplink signaling configuration for use outside of a COT. The processor may be configured to transmit a downlink control channel indicating that a base station has entered the COT to be shared with the UE, the COT being associated with a second uplink signaling configuration, wherein a density of transmission opportunities is greater outside of the shared channel occupancy time than within the shared channel occupancy time. The processor may be configured to receive a scheduling request or random access message from the UE according to one of the first uplink signaling configuration or the second uplink signaling configuration based on whether the base station is in the COT at a time of the scheduling request or random access message.

In another aspect, the disclosure provides an apparatus for wireless communication. The apparatus may include means for signaling at least a first uplink signaling configuration to a UE, the first uplink signaling configuration for use outside of a COT. The apparatus may include means for transmitting a downlink control channel indicating that a base station has entered the COT to be shared with the UE, the COT being associated with a second uplink signaling configuration, wherein a density of transmission opportunities is greater outside of the shared channel occupancy time than within the shared channel occupancy time. The apparatus may include means for receiving a scheduling request or random access message from the UE according to one of the first uplink signaling configuration or the second uplink signaling configuration based on whether the base station is in the COT at a time of the scheduling request or random access message.

In another aspect, the disclosure provides a computer-readable medium storing computer executable code. The computer-readable medium may include code to signal at least a first uplink signaling configuration to a UE, the first uplink signaling configuration for use outside of a COT. The computer-readable medium may include code to transmit a downlink control channel indicating that a base station has entered the COT to be shared with the UE, the COT being associated with a second uplink signaling configuration, wherein a density of transmission opportunities is greater outside of the shared channel occupancy time than within the shared channel occupancy time. The computer-readable medium may include code to receive a scheduling request or random access message from the UE according to one of the first uplink signaling configuration or the second uplink signaling configuration based on whether the base station is in the COT at a time of the scheduling request or random access message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
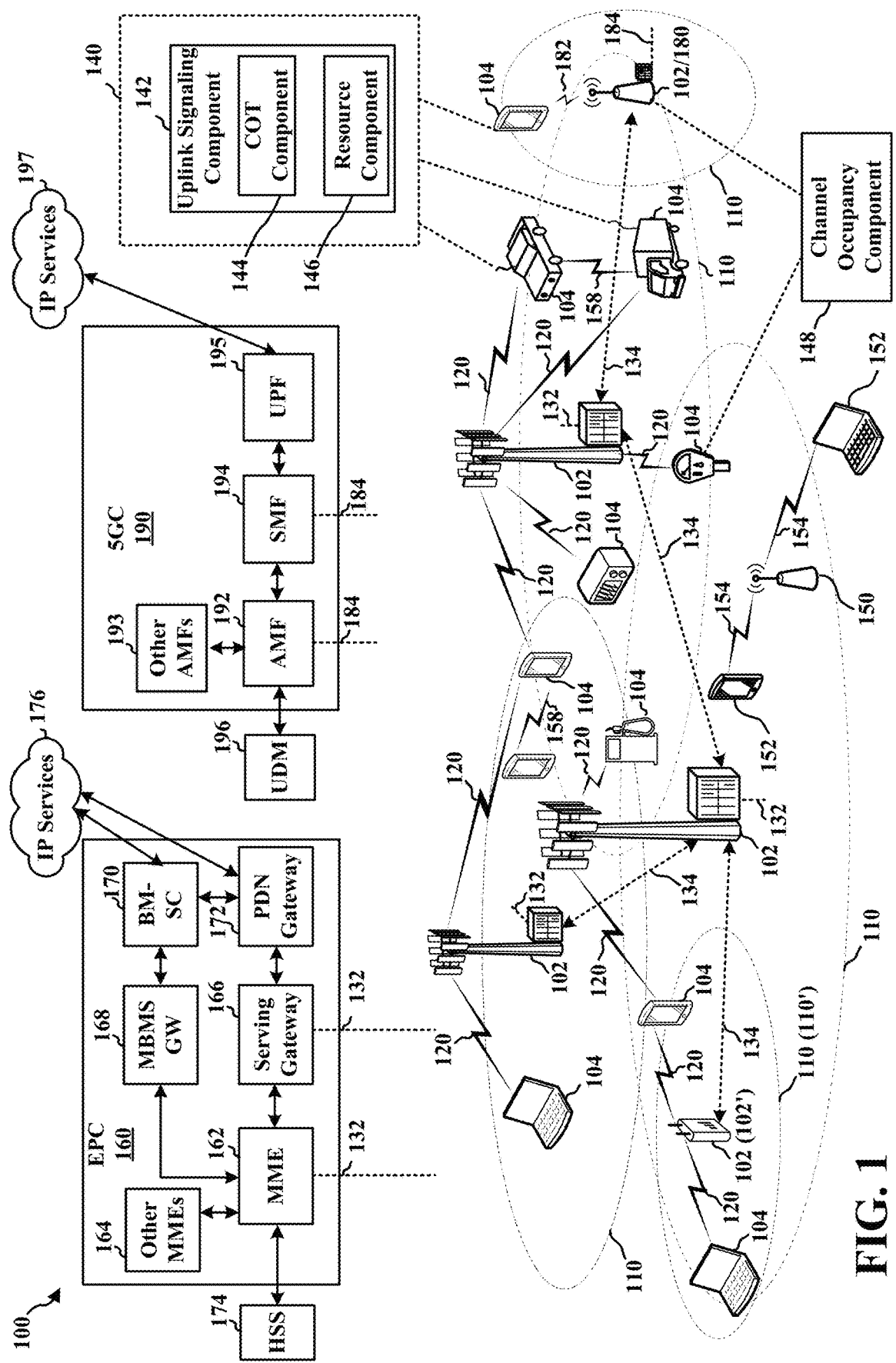
FIG. 1 is a diagram illustrating an example of a wireless communications system and an access network.
Figure 2:
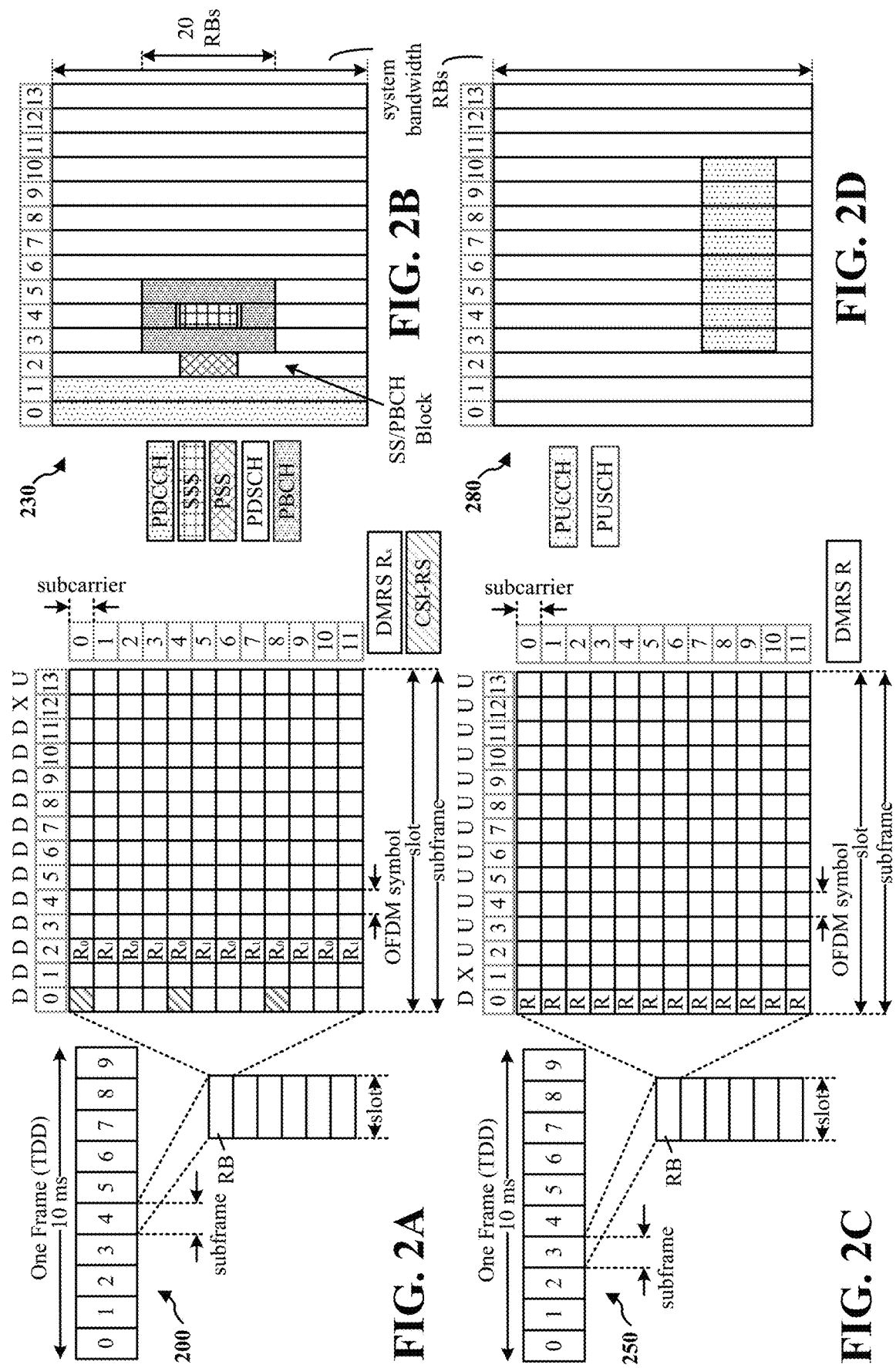
FIG. 2A is a diagram illustrating an example of a first 5G/NR frame.
FIG. 2B is a diagram illustrating an example of DL channels within a 5G/NR subframe.
FIG. 2C is a diagram illustrating an example of a second 5G/NR frame.
FIG. 2D is a diagram illustrating an example of a UL channels within a 5G/NR subframe.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A 5G NR system operating in unlicensed spectrum may share the unlicensed spectrum with other communications systems. A listen-before-talk (LBT) procedure may be used to prevent transmissions from interfering with ongoing communications of other systems. As discussed in further detail below, 5G NR may utilize frame structures to facilitate efficient communications. In order to implement frame structures in unlicensed spectrum, a base station (e.g., a gNB) may occupy a channel for a period of time by transmitting in a downlink direction and sharing the channel with user equipment (UE) for uplink transmissions. The period of time utilized by the base station may be referred to as a channel occupancy time (COT).

A UE may perform uplink transmissions either inside the COT or outside the COT. Uplink transmissions may be subject to LBT procedures. In an aspect, LBT procedures (e.g., LBT periods and/or energy detection thresholds) may be different inside and outside of the COT. Since the base station has reserved the channel during the COT, if the UE transmits using configured resources during the COT, the UE may generally experience higher LBT success rates (e.g., energy below an energy detection threshold) inside the COT. The higher success rate may apply when the same LBT type can be used for transmissions inside and outside of the COT. For example, control signaling such as physical random access channel (PRACH) transmissions and scheduling requests (SR) may occur either inside or outside the COT.

Uplink control signaling may be sensitive to latency. In particular, failure of an LBT procedure for control signaling may result in latency for an uplink transmission due to periodicity of uplink control signaling opportunities. One technique to reduce latency for control signaling is to reduce the periodicity of the uplink control signaling opportunities. Using a smaller periodicity for control signaling, however, may incur a larger overhead as resources are reserved for the control signaling. For example, supported periodicities for release 15 of 5G NR is listed in Table 1.

| Subcarrier Spacing (kHz) | Supported periodicity [#OFDM symbols in given numerology] or [ms] |
|---|---|
| 15 | 2 symbols, 7 symbols, 1, 2, 5, 10, 20, 40, 80 |
| 30 | 2 symbols, 7 symbols, 0.5, 1, 2, 5, 10, 20, 40, 80 |
| 60 | 2 symbols, 7 symbols (6 symbols for ECP), 0.25, 0.5, 1, 2, 5, 10, 20, 40, 80 |
| 120 | 2 symbols, 7 symbols, 0.125, 0.25, 0.5, 1, 2, 5, 10, 20, 40, 80 |

In an aspect, the present disclosure provides for multiple configurations of uplink control signaling opportunities. Generally, a higher density of control signaling opportunities may be utilized outside of a COT than inside the COT. Accordingly, a UE may transmit PRACH or SR outside of the COT, where LBT failure is more likely or more frequent, and overhead for uplink control signaling may be reduced within the COT. The higher density of control signaling opportunities may refer to a number of configured signaling opportunities per unit of time. The number of control signaling opportunities may be increased by configuring a smaller periodicity or by configuring a greater number of SR or PRACH resources per opportunity.

A UE may determine which configuration of uplink control resources to use based on whether the base station has entered a COT that is shared with the UE. For example, the base station may provide COT information in a group based physical downlink control channel (PDCCH) or a UE specific PDCCH when starting the COT. The COT information may indicate the uplink control signaling configuration. In an aspect, a PDCCH may indicate an uplink control signaling configuration without specific reference to COT information.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The gNB 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an uplink signaling component 142 for determining an uplink signaling configuration and transmitting uplink signaling according to the determined uplink signaling configuration. For example, the uplink signaling component 142 may be included in or implemented by the modem 140 of UE 104 or by one or more processors of the UE 104. Additionally, one or more base stations 102 may include a channel occupancy component 148 for occupying a channel in unlicensed or shared spectrum. The channel occupancy component 148 may also indicate when the base station 102 is occupying the channel and/or indicate an uplink signaling configuration to use.

Figure 5:
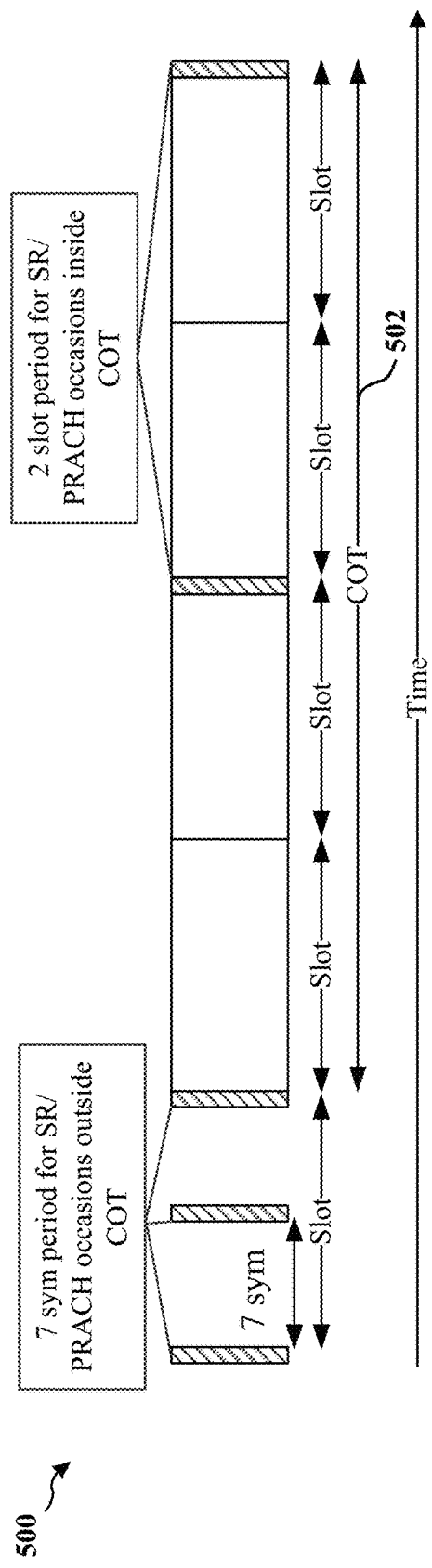
FIG. 5 is a resource diagram showing first example uplink signaling configurations.
Figure 6:
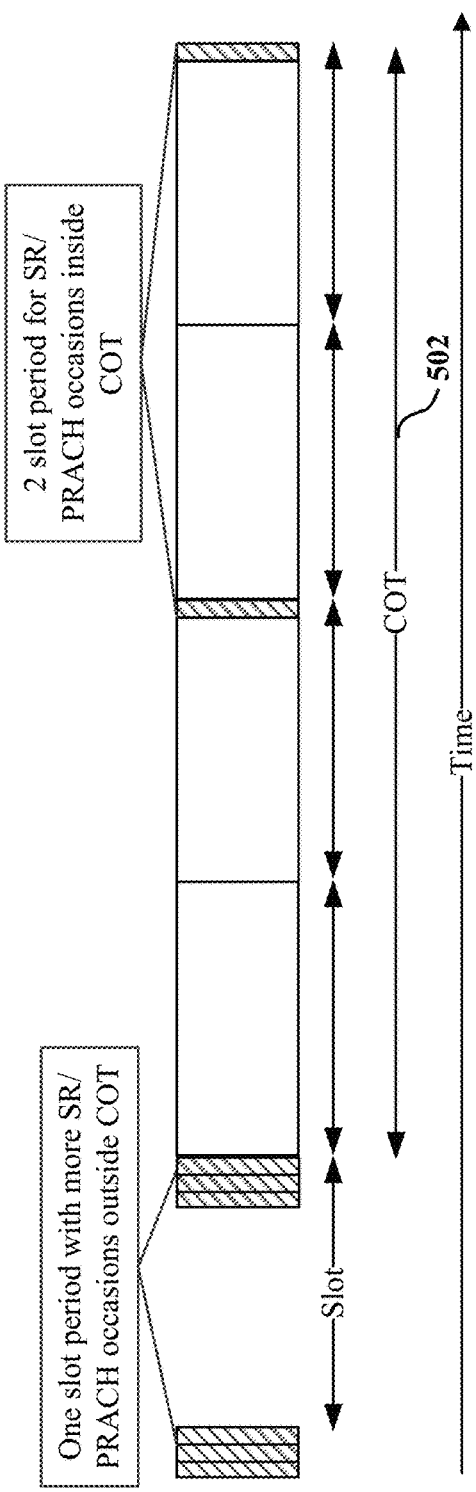
FIG. 6 is a resource diagram showing second example uplink signaling configurations.
Figure 7:
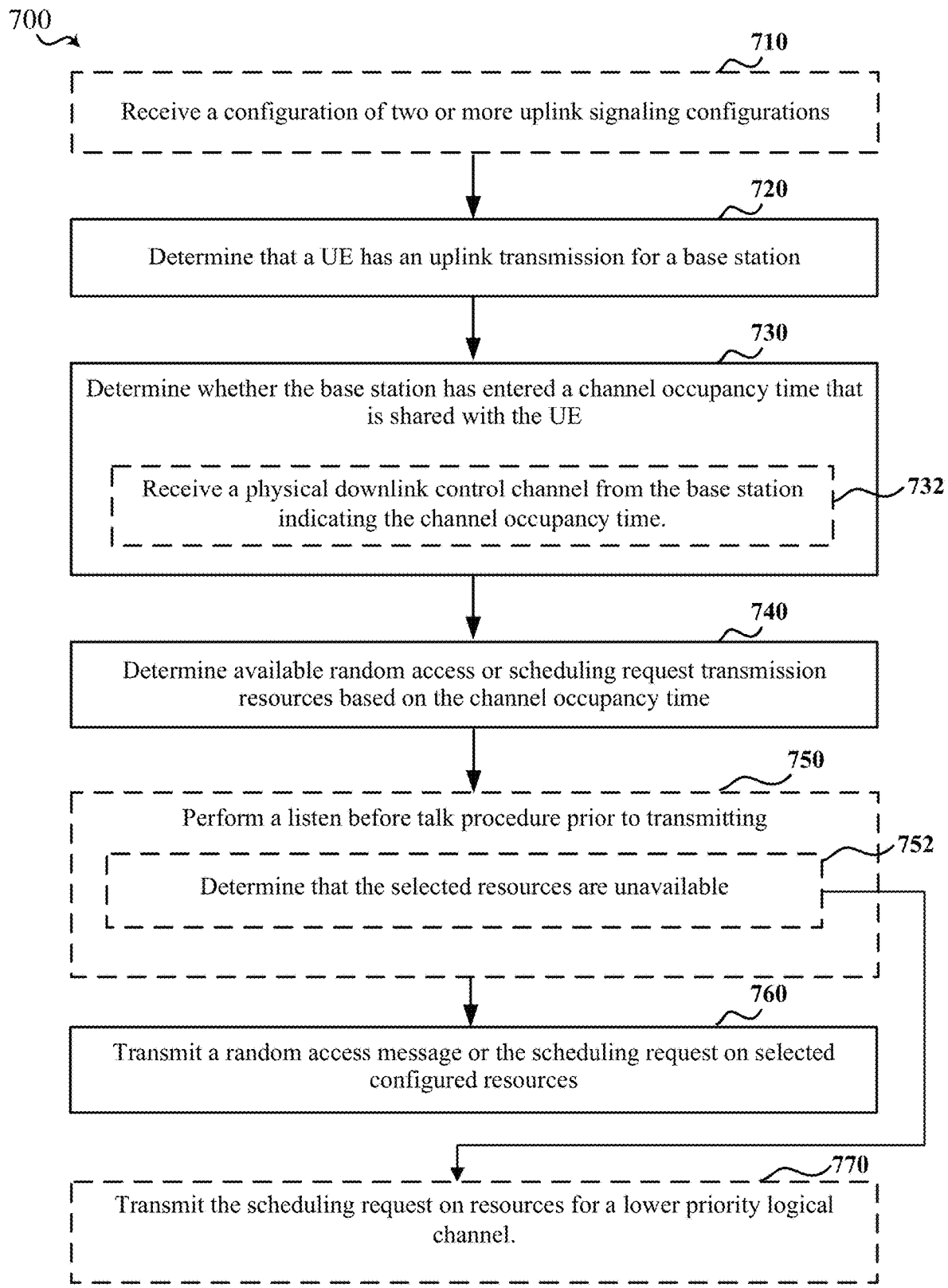
FIG. 7 is a flowchart of an example method of uplink signaling.
Figure 8:
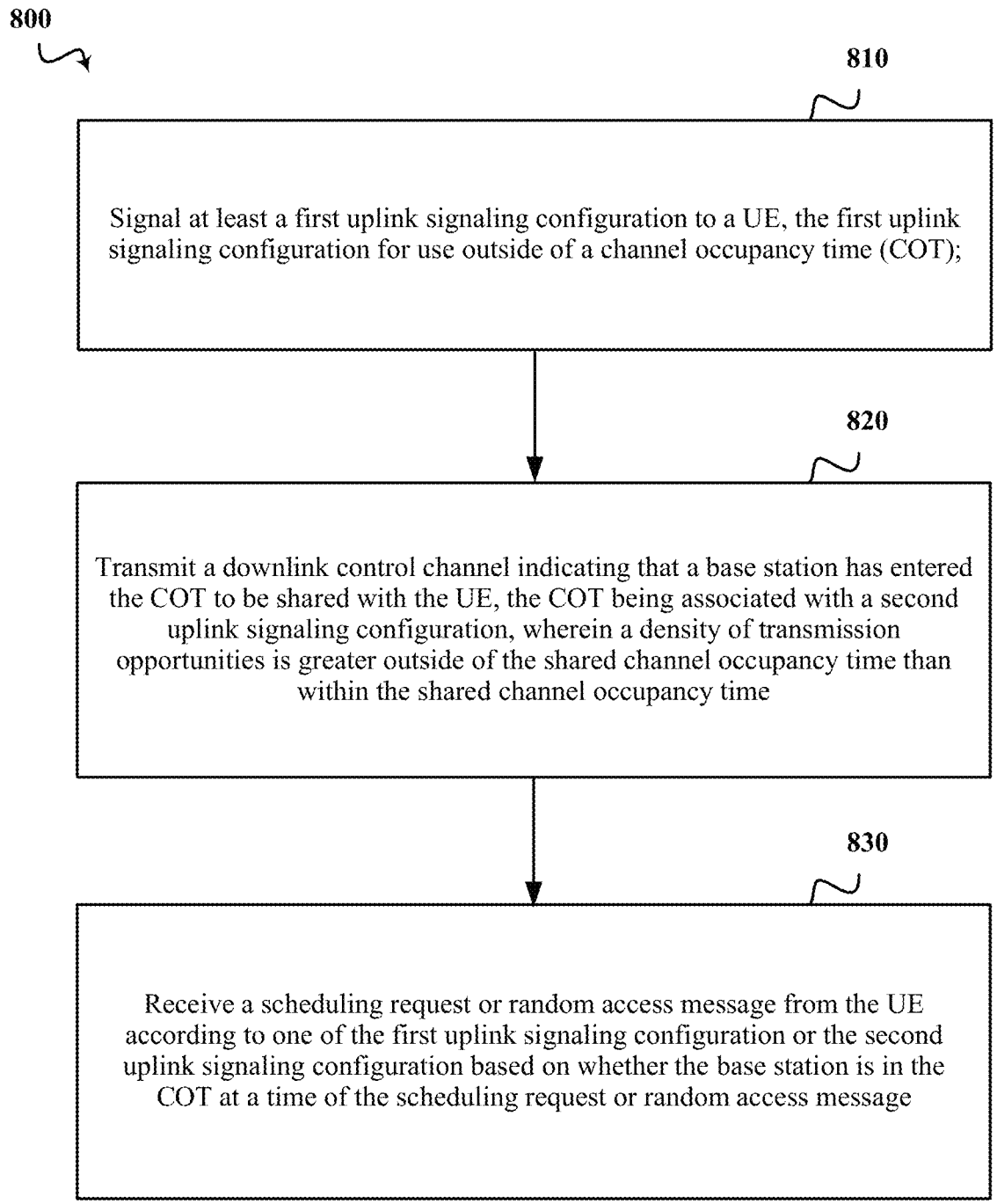
FIG. 8 is a flowchart of an example method of wireless communication.

Turning now to FIGS. 2A-9 aspects are depicted with reference to one or more components and one or more methods that may perform the actions or operations described herein, where aspects in dashed line may be optional. Although the operations described below in FIGS. 7 and 8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
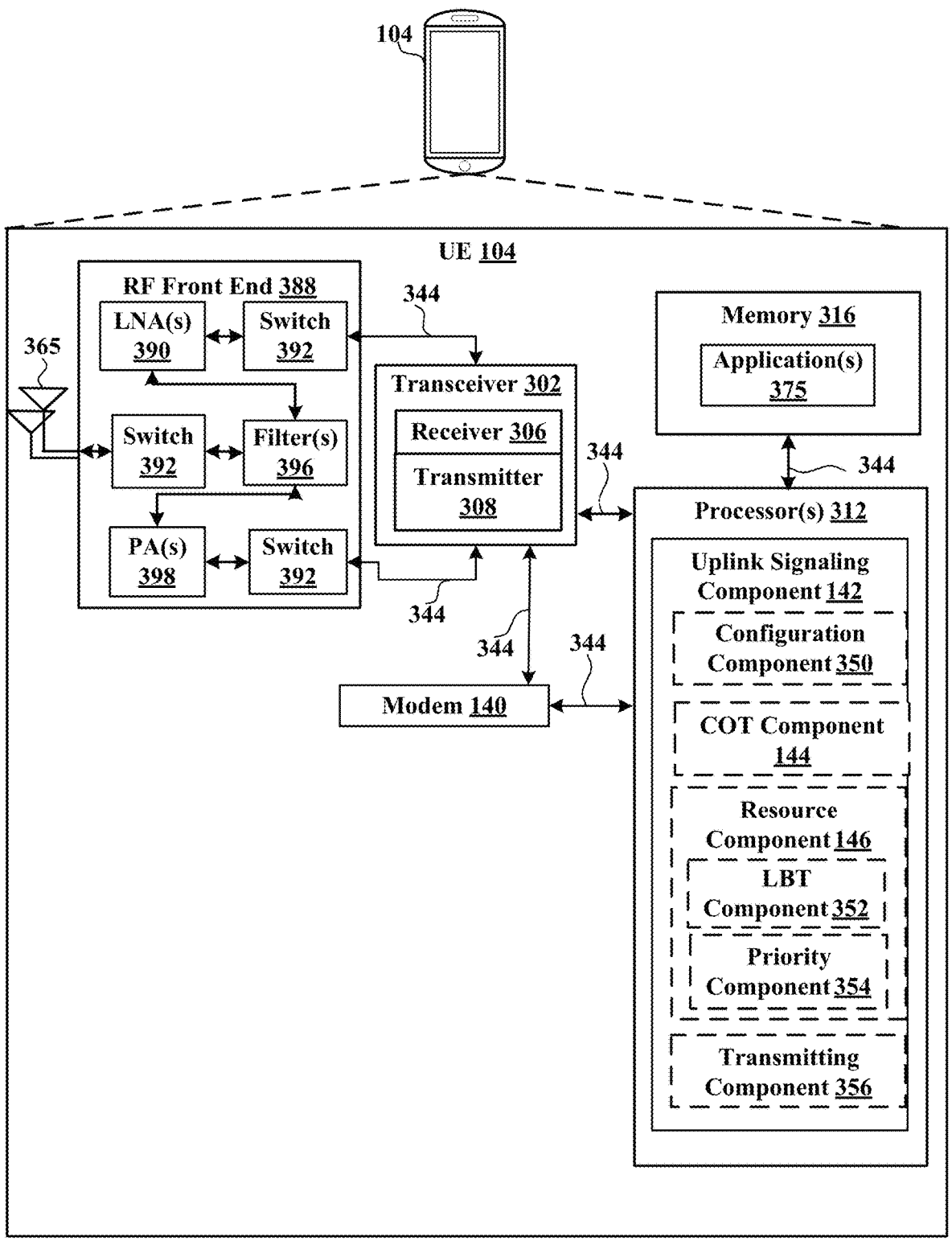
FIG. 3 is a schematic diagram of an example user equipment including an uplink signaling component.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 140 and/or uplink signaling component 142 to enable one or more of the functions described herein related to uplink control signaling inside or outside of a COT.

In an aspect, the one or more processors 312 can include a modem 140 and/or can be part of the modem 140 that uses one or more modem processors. Thus, the various functions related to uplink signaling component 142 may be included in modem 140 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 140 associated with uplink signaling component 142 may be performed by transceiver 302.

Also, memory 316 may be configured to store data used herein and/or local versions of applications 375 or uplink signaling component 142 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining uplink signaling component 142 and/or one or more of its subcomponents, and/or data associated therewith, when UE 104 is operating at least one processor 312 to execute uplink signaling component 142 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may include, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 302 to operate at a specified frequency and power level based on the UE configuration of the UE 104 and the communication protocol used by modem 140.

In an aspect, modem 140 can be a multiband-multimode modem, which can process digital data and communicate with transceiver 302 such that the digital data is sent and received using transceiver 302. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, uplink signaling component 142 may optionally include a configuration component 350 for determining at least two uplink signaling configurations. Each uplink signaling configuration may indicate a periodicity of configured uplink resources. The uplink signaling configuration may also indicate a number of uplink resources per uplink signaling opportunity. For example, a first uplink signaling configuration may be for uplink signaling outside a COT and a second uplink signaling configuration may be for uplink signaling inside a COT. Generally, the first uplink signaling configuration may have a greater density of uplink signaling opportunities. For example, the first uplink signaling configuration may have a smaller periodicity or a larger number of resources per uplink signaling opportunity than the second uplink signaling configuration. The uplink signaling configurations may be signaled by the network, for example, as radio resource control (RRC) layer signaling. The configuration component 350 may receive the signaled uplink signaling configurations and configure the uplink signaling component 142 with the received configurations.

In an aspect, uplink signaling component 142 may optionally include a COT component 144 for determining whether the base station 102 has entered a COT that is shared with the UE 104. For example, the COT component 144 may control the receiver 306 to receive COT information transmitted by the base station 102. The COT information may be included in a group based PDCCH such as a SFI or common PDCCH. The COT information may indicate that the base station 102 has entered a COT. The COT information may also include a duration of the COT. In an aspect, the COT component 144 may detect a medium reservation waveform. For example, a Wi-Fi preamble may include a short training field (STF), long training field (LTF), and/or a duration. A base station 102 may use a medium reservation waveform to occupy the channel. The COT component 144 may identify a medium reservation waveform and determine that the base station 102 has entered a COT.

The uplink signaling component 142 may optionally include a resource component 146 for determining one or more resources for an uplink transmission. The resource component 146 may determine the resources based on whether the base station 102 is in a COT. For example, the resource component 146 may determine the resources according to a first uplink signaling configuration when the base station 102 is outside of a COT and determine the resources according to the second uplink signaling configuration when the base station 102 is inside of the COT.

In an aspect, the uplink signaling component 142 and/or resource component 146 may include an LBT component 352 for performing an LBT procedure prior to a transmission. For example, the LBT component 352 may perform an LBT procedure on resources selected by the resource component 146 to determine whether the transmission should occur. For instance, the LBT component 352 may sense the selected resource for an LBT duration prior to the transmission and determine whether sensed energy exceeds an energy detection threshold. If the sensed energy exceeds the energy detection threshold, the LBT component 352 may block the transmission, and the transmission may be considered an LBT failure. If the sensed energy is less than the energy detection threshold, the LBT component 352 may allow the transmission to occur.

In an aspect, the uplink signaling component 142 and/or resource component 146 may include a priority component 354. Transmissions may be associated with logical channels based on a type or source of data to be transmitted. Each logical channel may be associated with a priority. Uplink signaling resources may also be associated with a priority corresponding to a logical channel. The resource component 146 may utilize the priority component 354 to select uplink signaling resources that correspond to a priority of a logical channel associated with the transmission. In an aspect, when a transmission experiences an LBT failure, the priority component 354 may identify another uplink signaling resource associated with a lower priority that may be used for the transmission. Accordingly, a high priority transmission may utilize lower priority resources if a transmission attempt fails. In contrast, a transmission associated with a lower priority logical channel may not utilize higher priority resources in the event of an LBT failure.

In an aspect, uplink signaling component 142 may optionally include a transmitting component 356 for transmitting uplink signaling such as an SR or PRACH on selected configured resources. The transmitting component 356 may control the transmitter 308 to transmit the uplink signaling. In an aspect, the transmitting component may transmit different content for the uplink signaling depending on whether the transmission occurs during the COT. Transmissions within the COT may be more reliable (e.g., less likelihood of LBT failure), so the transmitting component 356 may generally include additional content because resources may not be needed for multiple transmission opportunities. Additionally, the resources may be reserved by the base station and may not be used for a downlink transmission. For example, a SR transmission outside of the COT may only include an indication that the UE has data to transmit to the base station. In contrast, an SR transmission inside the COT may include a payload such as a buffer status report (BSR). As another example, a PRACH transmission outside of the COT may include only a preamble. In contrast, a PRACH transmission inside of the COT may include the preamble and a payload such as a UE identifier, C-RNTI, or small message.

Figure 4:
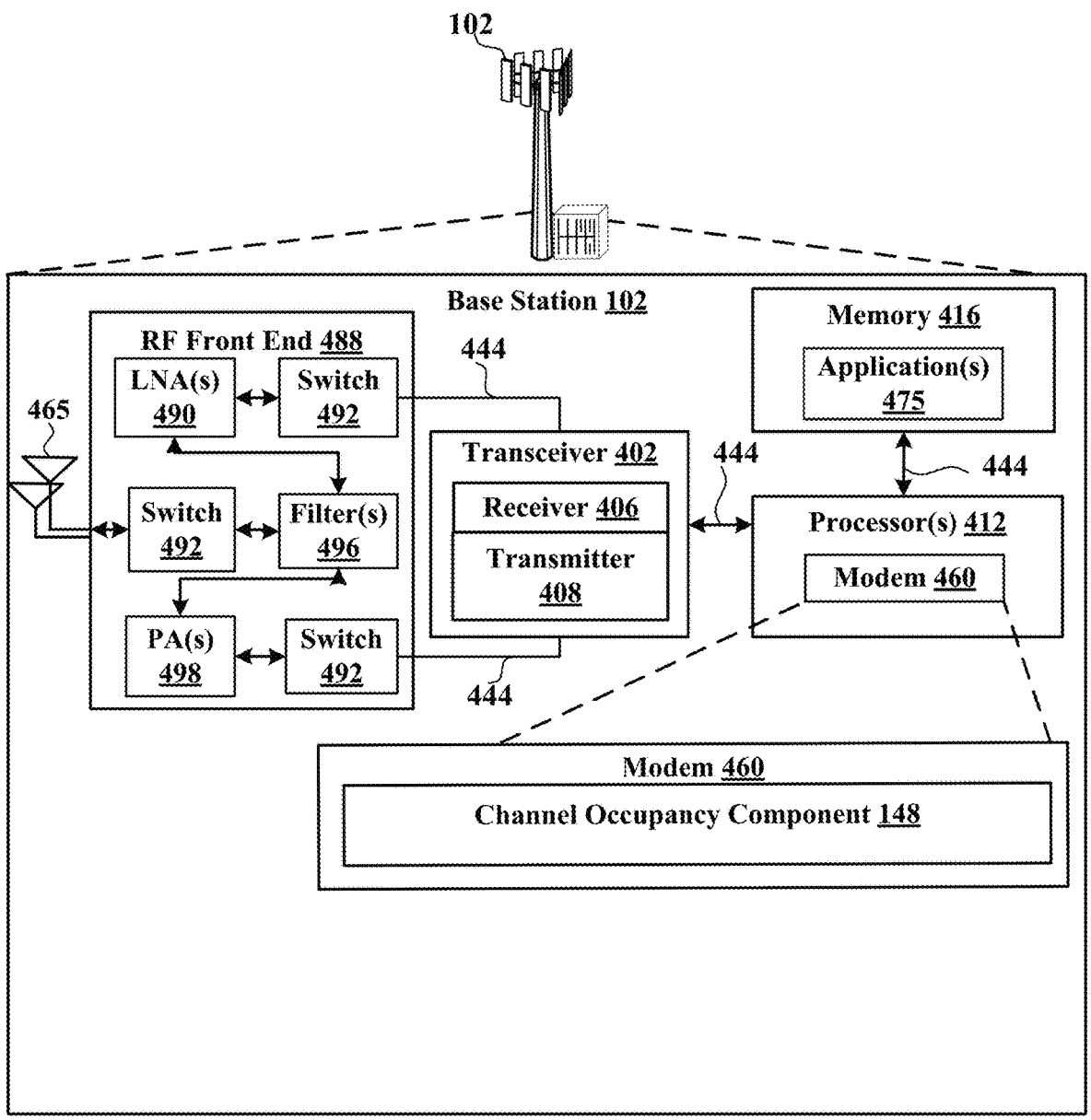
FIG. 4 is a schematic diagram of an example base station including a channel occupancy component

Referring to FIG. 4, one example of an implementation of a base station 102 may include a variety of components, some of which have already been described above, but including components such as one or more processors 412 and memory 416 and transceiver 402 in communication via one or more buses 444, which may operate in conjunction with modem 460 and channel occupancy component 148 to indicate to one or more UEs 104 whether the base station 102 is occupying a channel and sharing the COT with the UEs 104, or indicate an uplink signaling configuration for the UEs 104 to use.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of the UE 104, as described above, but configured or otherwise programmed for base station operations as opposed to UE operations.

FIG. 5 is a resource diagram showing a first example 500 of different uplink signaling configurations based on a COT 502. A first uplink signaling configuration may be used outside of the COT 502. The first uplink signaling configuration may have a periodicity of 7 symbols. One resource may be used for uplink signaling in each period. In this example, each slot may include 14 symbols, so an uplink signaling opportunity may occur twice each slot. In contrast, a second uplink configuration may be used inside of the COT 502. Again, one resource may be used for uplink signaling per period. The second uplink signaling configuration may have a periodicity of 2 slots. Accordingly, an uplink signaling opportunity may occur once every 2 slots or 28 symbols. Therefore, the first uplink signaling configuration may have a greater density of uplink signaling opportunities.

FIG. 6 is another resource diagram showing a second example 600 of different uplink signaling configurations based on a COT 502. A first uplink signaling configuration may be used outside of the COT 502. The first uplink signaling configuration may have a periodicity of 1 slot. Three resources (e.g., combinations of resource blocks and OFDM symbols) may be used for uplink signaling during each period, so there may be three uplink signaling opportunities per slot. In contrast, a second uplink configuration may be used inside of the COT 502. The second uplink signaling configuration may have a periodicity of 2 slots. One resource may be used for uplink signaling per period. Accordingly, an uplink signaling opportunity may occur once every 2 slots. Again, the first uplink signaling configuration may have a greater density of uplink signaling opportunities.

FIG. 7 is a flowchart of a method 700 of wireless communication. The method may be performed by an UE (e.g., the UE 104) including an uplink signaling component 142 in communication with a base station 102, which may include a channel occupancy component 148.

At block 710, the method 700 may include receiving a configuration of two or more uplink signaling configurations. In an aspect, for example, the UE 104, the processor 312, the RX processor 956, and/or the controller/processor 959 may execute the uplink signaling component 142 and/or the configuration component 350 to receive the configuration of two or more uplink signaling configurations. For instance, the configuration component 350 may receive the two or more uplink signaling configurations via RRC signaling. Accordingly, the UE 104, the processor 312, the RX processor 956, and/or the controller/processor 959 executing the uplink signaling component 142 and/or the configuration component 350 may provide means for receiving a configuration of two or more uplink signaling configurations.

At block 720, the method 700 may include determining that a UE has an uplink transmission for a base station. In an aspect, for example, the UE 104, the processor 312, the TX processor 968, and/or the controller/processor 959 may execute the uplink signaling component 142 to determine that the UE 104 has an uplink transmission for a base station 102. For example, the uplink signaling component 142 may check a status of an uplink buffer or receive an indication of the uplink transmission from an application 375. Accordingly, the UE 104, the processor 312, the TX processor 968, and/or the controller/processor 959 executing the uplink signaling component 142 may provide means for determining that a UE has an uplink transmission for a base station.

At block 730, the method 700 may include determining whether the base station has entered a channel occupancy time that is shared with the UE. In an aspect, for example, the UE 104, the processor 312, the RX processor 956, and/or the controller/processor 959 may execute the uplink signaling component 142 and/or the COT component 144 to determine whether the base station 102 has entered the COT 502 that is shared with the UE 104. For example, in block 732, determining whether the base station has entered the COT 502 may include receiving a physical downlink control channel (PDCCH) from the base station indicating the channel occupancy time. For example, the COT component 144 may decode a PDCCH to determine whether the PDCCH indicates a channel occupancy time. The COT component 144 may also determine whether the base station 102 is sharing the COT by configuring uplink resources for the UE 104. In an aspect, the PDCCH may be a group PDCCH such as an SFI or a common PDCCH. In another aspect, a base station 102 may indicate a COT by transmitting a medium reservation waveform. Accordingly, the UE 104, the processor 312, the RX processor 956, and/or the controller/processor 959 executing the uplink signaling component 142 and/or the COT component 144 may provide means for determining whether the base station has entered a channel occupancy time that is shared with the UE.

At block 740, the method 700 may include determining configured random access or scheduling request transmission resources based on the channel occupancy time. In an aspect, for example, the UE 104, the processor 312, the RX processor 956, and/or the controller/processor 959 may execute the uplink signaling component 142 and/or the resource component 146 to determine configured random access or scheduling request transmission resources based on the COT 502. For example, if the base station 102 is outside of the COT 502 (e.g., no COT indicated by the base station), the resource component 146 may determine the configured random access or scheduling request transmission resources based on a first uplink signaling configuration. In contrast, if the base station 102 is inside of the COT 502, the resource component 146 may determine the configured random access or scheduling request transmission resources based on a second uplink signaling configuration, or based on resources indicated within the PDCCH indicating the COT 502. In an aspect, where the transmission is associated with a logical channel and/or priority, the resource component 146 may select available random access or scheduling request transmission resources with a corresponding priority. Accordingly, the UE 104, the processor 312, the RX processor 956, and/or the controller/processor 959 executing the uplink signaling component 142 and/or the resource component 146 may provide means for determining configured random access or scheduling request transmission resources based on the channel occupancy time.

At block 750, the method 700 may include performing a listen before talk procedure prior to transmitting. In an aspect, for example, the UE 104, the processor 312, the RX processor 956, and/or the controller/processor 959 may execute the uplink signaling component 142 and/or the LBT component 352 to perform the listen before talk procedure prior to transmitting. For example, the listen before talk procedure may include sensing the configured resources, determining an energy level, and comparing the energy level to an energy detection threshold to determine whether the configured resources are occupied. If the resources are unoccupied (e.g., the detected energy is less than the energy detection threshold, the method 700 may proceed to block 760. In sub-block 752, performing the listen before talk procedure may include determining that the selected resources are unavailable. For example, the LBT component 352 may determine that the detected energy level exceeds the energy detection threshold and determine that the selected resources are occupied. Accordingly, the UE 104, the processor 312, the RX processor 956, and/or the controller/processor 959 executing the uplink signaling component 142 and/or the LBT component 352 may provide means for performing a listen before talk procedure prior to transmitting. The method 700 may proceed to block 770 in response to determining that the selected resources are occupied.

At block 760, the method 700 may include transmitting a random access message or the scheduling request on selected configured resources. In an aspect, for example, the UE 104, the processor 312, the TX processor 968, and/or the controller/processor 959 may execute the uplink signaling component 142 and/or the transmitting component 356 to transmit the random access message or the scheduling request on the selected configured resources. In an aspect, a SR transmission outside of the COT may only include an indication that the UE has data to transmit to the base station. In contrast, an SR transmission inside the COT may include a payload such as a BSR. As another example, a PRACH transmission outside of the COT may include only a preamble. In contrast, a PRACH transmission inside of the COT may include the preamble and a payload such as a UE identifier, C-RNTI, or small message. Accordingly, the UE 104, the processor 312, the TX processor 968, and/or the controller/processor 959 executing the uplink signaling component 142 and/or the transmitting component 356 may provide means for transmitting a random access message or the scheduling request on selected configured resources.

In block 770, the method 700 may include transmitting the scheduling request on resources for a lower priority logical channel. In an aspect, for example, the UE 104, the processor 312, the TX processor 968, and/or the controller/processor 959 may execute the uplink signaling component 142 and/or the transmitting component 356 to transmit the scheduling request on resources for a lower priority logical channel. That is, the resources for the lower priority logical channel may be preempted for a higher priority logical channel. If no lower priority logical channel resources are available, however, the transmitting component 356 may wait for a next transmission opportunity for transmission at the priority level. Accordingly, the UE 104, the processor 312, the TX processor 968, and/or the controller/processor 959 executing the uplink signaling component 142 and/or the transmitting component 356 may provide means for transmitting the scheduling request on resources for a lower priority logical channel.

FIG. 8 is a flowchart of a method 800 of wireless communication. The method may be performed by a base station (e.g., the base station 102) including a channel occupancy component 148 in communication with a UE 104, which may include an uplink signaling component 142.

In block 810, the method 800 may include signaling at least a first uplink signaling configuration to a UE, the first uplink signaling configuration for use outside of a channel occupancy time (COT). In an aspect, for example, the base station 102, the processor 412, the TX processor 916, and/or the controller/processor 975 may execute the channel occupancy component 148 to control the transmitter 408 to signal at least a first uplink signaling configuration to a UE 104, the first uplink signaling configuration for use outside of the COT 502. For example, the channel occupancy component 148 may signal the uplink signaling configuration using RRC signaling.

In block 820, the method 800 may include transmitting a downlink control channel indicating that a base station has entered the COT to be shared with the UE. In an aspect, the base station 102, the processor 412, the TX processor 916, and/or the controller/processor 975 may execute the channel occupancy component 148 to control the transmitter 408 to transmit a downlink control channel indicating that a base station has entered the COT 502 to be shared with the UE 104. The COT may be associated with a second uplink signaling configuration. A density of transmission opportunities may be greater outside of the shared channel occupancy time than within the shared channel occupancy time.

In block 830, the method 800 may include receiving a scheduling request or random access message from the UE according to one of the first uplink signaling configuration or the second uplink signaling configuration based on whether the base station is in the COT at a time of the scheduling request or random access message. In an aspect, for example, the base station 102, the processor 412, the RX processor 970, and/or the controller/processor 975 may execute the channel occupancy component 148 to control the receiver 406 to receive a scheduling request or random access message from the UE 104 according to one of the first uplink signaling configuration or the second uplink signaling configuration based on whether the base station is in the COT 502 at a time of the scheduling request or random access message.

Figure 9:
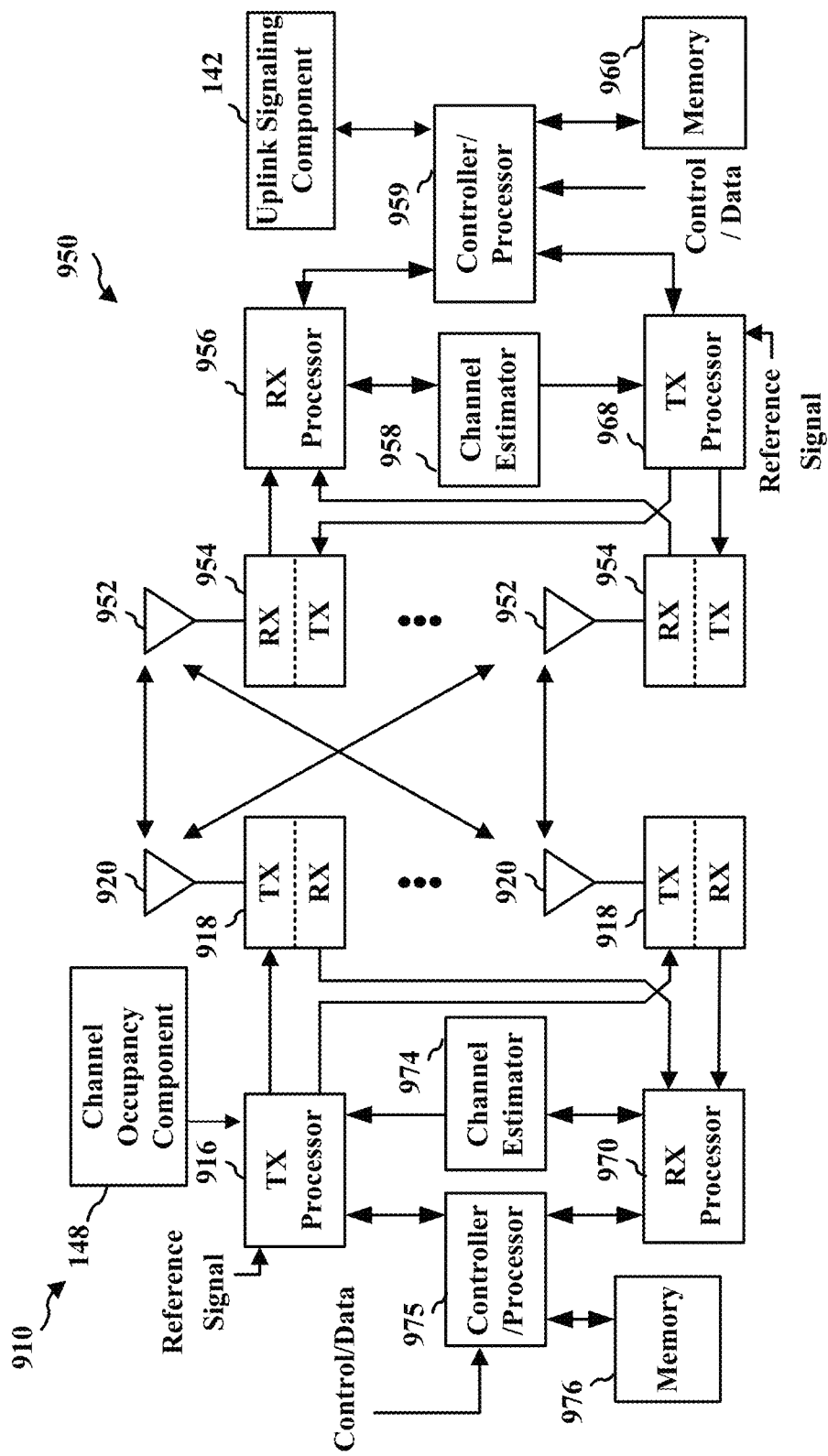
FIG. 9 is a diagram illustrating an example of a base station and UE in an access network.

FIG. 9 is a block diagram of a base station 910 in communication with a UE 950 in an access network. The base station 910 may be an example of the base station 102 including a channel occupancy component 148. The UE 950 may be an example of the UE 104 including the uplink signaling component 142. In the DL, IP packets from the EPC 160 may be provided to a controller/processor 975. The controller/processor 975 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 975 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 916 and the receive (RX) processor 970 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 916 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream may then be provided to a different antenna 920 via a separate transmitter 918TX. Each transmitter 918TX may modulate an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The TX processor 968 and the RX processor 956 implement layer 1 functionality associated with various signal processing functions. The RX processor 956 may perform spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 910. These soft decisions may be based on channel estimates computed by the channel estimator 958. The soft decisions are then decoded and deinterleaved to recover the data and control signals that were originally transmitted by the base station 910 on the physical channel. The data and control signals are then provided to the controller/processor 959, which implements layer 3 and layer 2 functionality.

The controller/processor 959 can be associated with a memory 960 that stores program codes and data. The memory 960 may be referred to as a computer-readable medium. In the UL, the controller/processor 959 provides demultiplexing between transport and logical channels, packet reassembly, deciphering, header decompression, and control signal processing to recover IP packets from the EPC 160. The controller/processor 959 is also responsible for error detection using an ACK and/or NACK protocol to support HARQ operations.

Similar to the functionality described in connection with the DL transmission by the base station 910, the controller/processor 959 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 958 from a reference signal or feedback transmitted by the base station 910 may be used by the TX processor 968 to select the appropriate coding and modulation schemes, and to facilitate spatial processing. The spatial streams generated by the TX processor 968 may be provided to different antenna 952 via separate transmitters 954TX. Each transmitter 954TX may modulate an RF carrier with a respective spatial stream for transmission.

The UL transmission is processed at the base station 910 in a manner similar to that described in connection with the receiver function at the UE 950. Each receiver 918RX receives a signal through its respective antenna 920. Each receiver 918RX recovers information modulated onto an RF carrier and provides the information to a RX processor 970.

The controller/processor 975 can be associated with a memory 976 that stores program codes and data. The memory 976 may be referred to as a computer-readable medium. In the UL, the controller/processor 975 provides demultiplexing between transport and logical channels, packet reassembly, deciphering, header decompression, control signal processing to recover IP packets from the UE 950. IP packets from the controller/processor 975 may be provided to the EPC 160. The controller/processor 975 is also responsible for error detection using an ACK and/or NACK protocol to support HARQ operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    determining that a UE has an uplink transmission for a base station;
    determining whether the base station has entered a channel occupancy time that is shared with the UE;
    determining configured random access or scheduling request transmission resources based on the channel occupancy time, wherein a density of transmission opportunities for random access or scheduling request transmission is greater outside of the shared channel occupancy time than within the shared channel occupancy time; and
    transmitting a random access message or a scheduling request on selected configured resources.

2. The method of claim 1, wherein the greater density of transmission opportunities includes a smaller periodicity of transmission opportunities outside of the channel occupancy time.

3. The method of claim 1, wherein the greater density of transmission opportunities includes a greater number of resources per period.

4. The method of claim 1, wherein a scheduling request transmission outside of the shared channel occupancy time indicates that the UE has the uplink transmission for the base station.

5. The method of claim 1, wherein a scheduling request transmission inside of the shared channel occupancy time includes a payload.

6. The method of claim 5, wherein the payload is a buffer status report.

7. The method of claim 1, wherein a physical random access channel (PRACH) transmission outside of the shared channel occupancy time includes a preamble.

8. The method of claim 1, wherein a PRACH transmission inside of the shared channel occupancy time includes a preamble and a payload.

9. The method of claim 1, wherein determining whether the base station has entered the channel occupancy time that is shared with the UE comprises receiving a physical downlink control channel from the base station indicating the channel occupancy time.

10. The method of claim 1, wherein the scheduling request corresponds to a logical channel having a priority level, the method further comprising:
    determining that the selected configured resources are unavailable; and
    transmitting the scheduling request on resources for a lower priority logical channel.

11. The method of claim 1, further comprising performing a listen before talk procedure prior to transmitting, wherein an energy detection threshold for the listen before talk procedure is lesser outside the channel occupancy time than inside of the channel occupancy time.

12. The method of claim 11, wherein the energy detection threshold is based on a medium reservation preamble transmitted by the base station.

13. An apparatus for wireless communication, comprising:
    a memory; and
    at least one processor coupled to the memory and configured to:
        determine that a UE has an uplink transmission for a base station;
        determine whether the base station has entered a channel occupancy time that is shared with the UE;
        determine configured random access or scheduling request transmission resources based on the channel occupancy time, wherein a density of transmission opportunities for random access or scheduling request transmission is greater outside of the shared channel occupancy time than within the shared channel occupancy time; and
        transmit a random access message or a scheduling request on selected configured resources.

14. The apparatus of claim 13, wherein the greater density of transmission opportunities includes a smaller periodicity of transmission opportunities outside of the channel occupancy time.

15. The apparatus of claim 13, wherein the greater density of transmission opportunities includes a greater number of resources per period.

16. The apparatus of claim 13, wherein a scheduling request transmission outside of the shared channel occupancy time indicates that the UE has the uplink transmission for the base station.

17. The apparatus of claim 13, wherein a scheduling request transmission inside of the shared channel occupancy time includes a payload.

18. The apparatus of claim 17, wherein the payload is a buffer status report.

19. The apparatus of claim 13, wherein a physical random access channel (PRACH) transmission outside of the shared channel occupancy time includes a preamble.

20. The apparatus of claim 13, wherein a PRACH transmission inside of the shared channel occupancy time includes a preamble and a payload.

21. The apparatus of claim 13, wherein the at least one processor is configured to receive a physical downlink control channel from the base station indicating the channel occupancy time.

22. The apparatus of claim 13, wherein the scheduling request corresponds to a logical channel having a priority level, wherein the at least one processor is configured to:
    determine that the selected configured resources are unavailable; and transmit the scheduling request on resources for a lower priority logical channel.

23. The apparatus of claim 13, wherein the at least one processor is configured to perform a listen before talk procedure prior to transmitting, wherein an energy detection threshold for the listen before talk procedure is lesser outside the channel occupancy time than inside of the channel occupancy time.

24. The apparatus of claim 23, wherein the energy detection threshold is based on a medium reservation preamble transmitted by the base station.

25. An apparatus for wireless communication, comprising:
   means for determining that a UE has an uplink transmission for a base station;
   means for determining whether the base station has entered a channel occupancy time that is shared with the UE;
   means for determining configured random access or scheduling request transmission resources based on the channel occupancy time, wherein a density of transmission opportunities for random access or scheduling request transmission is greater outside of the shared channel occupancy time than within the shared channel occupancy time; and
   means for transmitting a random access message or a scheduling request on selected configured resources.

26. The apparatus of claim 25, wherein the greater density of transmission opportunities includes a smaller periodicity of transmission opportunities or a greater number of resources per period outside of the channel occupancy time.

27. The apparatus of claim 25, wherein a scheduling request transmission inside of the shared channel occupancy time includes a payload, wherein the payload is a buffer status report.

28. The apparatus of claim 25, wherein the scheduling request corresponds to a logical channel having a priority level, the apparatus further comprising:
   means for determining that the selected configured resources are unavailable; and
   means for transmitting the scheduling request on resources for a lower priority logical channel.

29. The apparatus of claim 25, further comprising means for performing a listen before talk procedure prior to transmitting, wherein an energy detection threshold for the listen before talk procedure is lesser outside the channel occupancy time than inside of the channel occupancy time, wherein the energy detection threshold is based on a medium reservation preamble transmitted by the base station.

30. A non-transitory computer-readable medium storing computer executable code, comprising code to:
   determine that a UE has an uplink transmission for a base station;
   determine whether the base station has entered a channel occupancy time that is shared with the UE;
   determine configured random access or scheduling request transmission resources based on the channel occupancy time, wherein a density of transmission opportunities for random access or scheduling request transmission is greater outside of the shared channel occupancy time than within the shared channel occupancy time; and
   transmit a random access message or a scheduling request on selected configured resources.

* * * * *